United States Patent
Umayahara

(10) Patent No.: US 8,609,292 B2
(45) Date of Patent: Dec. 17, 2013

(54) FUEL CELL SYSTEM

(75) Inventor: Kenji Umayahara, Aichi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 537 days.

(21) Appl. No.: 12/300,849

(22) PCT Filed: May 29, 2007

(86) PCT No.: PCT/JP2007/061395
§ 371 (c)(1),
(2), (4) Date: Nov. 14, 2008

(87) PCT Pub. No.: WO2007/142246
PCT Pub. Date: Dec. 13, 2007

(65) Prior Publication Data
US 2009/0155652 A1    Jun. 18, 2009

(30) Foreign Application Priority Data
Jun. 7, 2006 (JP) ................................. 2006-158644

(51) Int. Cl.
*H01M 8/04* (2006.01)
(52) U.S. Cl.
USPC ........................... 429/446; 429/442; 429/444
(58) Field of Classification Search
USPC ....................................................... 429/446
See application file for complete search history.

(56) References Cited

U.S. PATENT DOCUMENTS

| | | | |
|---|---|---|---|
| 2005/0092301 A1 | 5/2005 | Fukuda | |
| 2005/0147863 A1* | 7/2005 | Hiramatsu et al. | 429/34 |
| 2005/0244688 A1* | 11/2005 | Suzuki | 429/23 |
| 2007/0111058 A1 | 5/2007 | Yoshida | |

FOREIGN PATENT DOCUMENTS

| | | |
|---|---|---|
| CN | 1692519 A | 11/2005 |
| DE | 102004051391 A1 | 6/2005 |
| DE | 112004002513 T5 | 3/2008 |
| JP | 01-056218 A | 3/1989 |
| JP | 04-066745 A | 3/1992 |

(Continued)

OTHER PUBLICATIONS

Office Action mailed Oct. 2, 2012 in JP 2006-158644 and partial translation thereof.

(Continued)

*Primary Examiner* — John S Maples
(74) *Attorney, Agent, or Firm* — Kenyon & Kenyon LLP

(57) ABSTRACT

A basic injection time of an injector is obtained from an FC current detected in step S1. The basic injection time based on the FC current is multiplied by a predetermined correction coefficient for correction (learning), and the thus obtained value is re-defined as the basic injection time to obtain an injection time feedforward term (F/F term) to be obtained finally. The correction coefficient K is set by obtaining a flow rate characteristic per unit drive time of the injector in accordance with the relation between a total drive time and a total injection quantity of the injector until an FC inlet pressure on the anode side of a fuel cell reaches a predetermined target pressure by increasing the FC inlet pressure to the target pressure at a system start. The correction coefficient K is updated every system start.

8 Claims, 5 Drawing Sheets

(56) References Cited

FOREIGN PATENT DOCUMENTS

| | | |
|---|---|---|
| JP | 05-079381 | 3/1993 |
| JP | 2003-042001 A | 2/2003 |
| JP | 2004-79490 A | 3/2004 |
| JP | 2004-152657 A | 5/2004 |
| JP | 2004-185974 A | 7/2004 |
| JP | 2004-207024 A | 7/2004 |
| JP | 2004-342386 A | 12/2004 |
| JP | 2005-100820 A | 4/2005 |
| JP | 2005-139928 A | 6/2005 |
| JP | 2005-150090 A | 6/2005 |
| JP | 2005-190824 A | 7/2005 |
| JP | 2005-195170 A | 7/2005 |
| JP | 2005-299547 A | 10/2005 |
| WO | WO 2004/059767 A2 | 7/2004 |
| WO | 2005/088755 A1 | 9/2005 |

OTHER PUBLICATIONS

Office Action dated Apr. 19, 2013 for co-pending German Application No. DE 112007001330.3.

* cited by examiner

FUEL CELL SYSTEM

This is a 371 national phase application of PCT/JP2007/061395 filed 29 May 2007, which claims priority to Japanese Patent Application No. 2006-158644 filed 7 Jun. 2006, the contents of which are incorporated herein by reference.

TECHNICAL FIELD

The present invention relates to a fuel cell system including a fuel cell for receiving the supply of a reactant gas (a fuel gas and an oxidizing gas) to generate power.

BACKGROUND ART

At present, a fuel cell system including a fuel cell for receiving the supply of a reactant gas (a fuel gas and an oxidizing gas) to generate power has been suggested and put to practical use. Such a fuel cell system is provided with a fuel supply passage for feeding, to the fuel cell, the fuel gas supplied from a fuel supply source such as a hydrogen tank.

Furthermore, a fuel cell system including a variable pressure adjustment valve as a pressure adjustment valve provided on the fuel supply passage so as to adjust the pressure of the fuel gas to be supplied to the fuel cell is known, the variable pressure adjustment valve being configured to exert the applied pressure of the oxidizing gas as a pressure source, thereby adjusting the pressure of the fuel gas to be supplied to the fuel cell (e.g., see Japanese Patent Application Laid-Open No. 2005-150090).

DISCLOSURE OF THE INVENTION

According to a variable pressure adjustment valve disclosed in Japanese Patent Application Laid-Open No. 2005-150090, the supply pressure of a fuel gas can be changed in accordance with an operating situation. However, even such a variable pressure adjustment valve cannot avoid the influence of aging and individual difference, and pressure adjustment precision and responsiveness to pressure might sometimes be lowered.

The present invention has been developed in view of such a situation, and an object thereof is to appropriately change the supply pressure of a fuel gas in accordance with the operation state of a fuel cell and to secure a satisfactory responsiveness to pressure while minimizing the influence of the aging and individual difference.

To achieve the above object, a fuel cell system according to the present invention is a fuel cell system comprising: a fuel cell; a fuel supply system which supplies a fuel gas to this fuel cell; a gas state variable supply device which adjusts the gas state of this fuel supply system on an upstream side to supply the gas to a downstream side; and control device for driving and controlling the gas state variable supply device in accordance with the operation state of the fuel cell, the system further comprising: learning device for learning the driving characteristics of the gas state variable supply device to set the driving parameter of the gas state variable supply device based on the result of the learning, the learning device being configured to learn the driving characteristics by use of at least a first value based on a gas supply change having a predetermined value or more in the gas state variable supply device and a second value based on the operation command value of the gas state variable supply device.

The learning device may correct the driving characteristics of the gas state variable supply device to be learned in accordance with the upstream pressure of the gas state variable supply device.

The learning device may correct the driving characteristics of the gas state variable supply device to be learned in accordance with the temperature of the fuel gas.

As the gas state variable supply device, there may be used an injector including an inner passage which connects the upstream side of the injector to the downstream side thereof, a valve body movably arranged in the inner passage and configured to change the opening state of the inner passage in accordance with the moved position of the valve body, and a valve body driving portion which drives the valve body by an electromagnetic driving force.

As the operation command value, a command value which controls the injection time of the injector may be employed.

The injection time of the injector includes a basic injection time obtained from the power generation current of the fuel cell as a feedforward term, and the learning device may reflect the result of the learning in the feedforward term.

The gas supply change may be the rise of the downstream pressure of the gas state variable supply device.

Another fuel cell system according to the present invention is a fuel cell system comprising: a fuel cell; a fuel supply system which supplies a fuel gas to this fuel cell; a gas state variable supply device which adjusts the gas state of this fuel supply system on an upstream side to supply the gas to a downstream side; and control device for driving and controlling the gas state variable supply device in accordance with the operation state of the fuel cell, the system further comprising: learning device for learning the driving characteristics of the gas state variable supply device to set the driving parameter of the gas state variable supply device based on the result of the learning, the learning device being configured to drive the gas state variable supply device on mutually different driving conditions and to learn the invalid supply time of the gas state variable supply device from the number of fuel gas supply times on these driving conditions.

The invalid supply time is a time required from a time when the gas state variable supply device receives a driving control signal from the control device to a time when the gas state variable supply device actually starts the gas supply.

The mutually different driving conditions may be at least one of the rise breadth of the downstream pressure of the gas state variable supply device and the supply time of the fuel gas to be supplied once by the gas state variable supply device.

In the above fuel cell system, the learning device may perform the learning at the start of the fuel cell.

According to these constitutions, the fluctuation of the driving characteristics or the invalid supply time due to the aging and individual difference of the gas state variable supply device is learned, and the learning result can be reflected in the driving and controlling of the gas state variable supply device. It is to be noted that "the gas state" is the state (flow range, pressure, temperature, molar concentration or the like) of the gas, and particularly includes at least one of the gas flow rate and the gas pressure.

The gas state variable supply device may be an injector of an electromagnetic driving system, or a variable pressure adjustment regulator such as a diaphragm type regulator in which a valve body is driven by, for example, an air pressure or a motor via a diaphragm.

Examples of the driving characteristics of the gas state variable supply device include a relation between a fuel cell inlet-side gas state (the secondary-side gas state of the gas state variable supply device) and an inlet-side target gas state (the secondary-side target gas state of the gas state variable supply device), a relation between the fuel cell inlet-side gas state (the secondary-side gas state of the gas state variable supply device) and the power generation current, a relation between a primary-side gas state and the secondary-side gas state of the gas state variable supply device, and a relation between the primary-side gas state of the gas state variable supply device and the power generation current of the fuel cell.

Examples of the driving parameter of the gas state variable supply device include an injection quantity, an injection time, a duty ratio, a driving frequency and a driving pulse in a case where the gas state variable supply device is the above injector of the electromagnetic driving system. The examples include an applied pressure (e.g., a fluid pressure or a spring pressure) which urges the valve body in an opened direction or a closed direction via the diaphragm in a case where the gas state variable supply device is the above diaphragm type regulator.

In the above fuel cell system, according to the constitution in which the driving characteristics of the gas state variable supply device to be learned are corrected in accordance with the upstream pressure or the temperature of the gas state variable supply device, highly precise learning can be performed.

In the above fuel cell system, according to the constitution in which the result of the learning is reflected in the feedforward term included in the injection time of the injector, the responsiveness of the injector can further be improved.

In the above fuel cell system, according to the constitution in which the learning is performed at the start of the fuel cell (at the start of the system), the highly precise learning can be performed in a state in which any fuel gas is not consumed by the fuel cell, in other words, in a state in which only little disturbance is present.

According to the present invention, there can be provided a fuel cell system having a satisfactory responsiveness without being influenced by the aging and individual difference of the gas state variable supply device.

BEST MODE FOR CARRYING OUT THE INVENTION

A fuel cell system 1 according to an embodiment of the present invention will hereinafter be described with reference to the drawings. In the present embodiment, an example in which the present invention is applied to a car-mounted power generation system of a fuel cell vehicle (a mobile body) will be described. First, a constitution of the fuel cell system 1 according to the embodiment of the present invention will be described with reference to FIG. 1.

Figure 1:
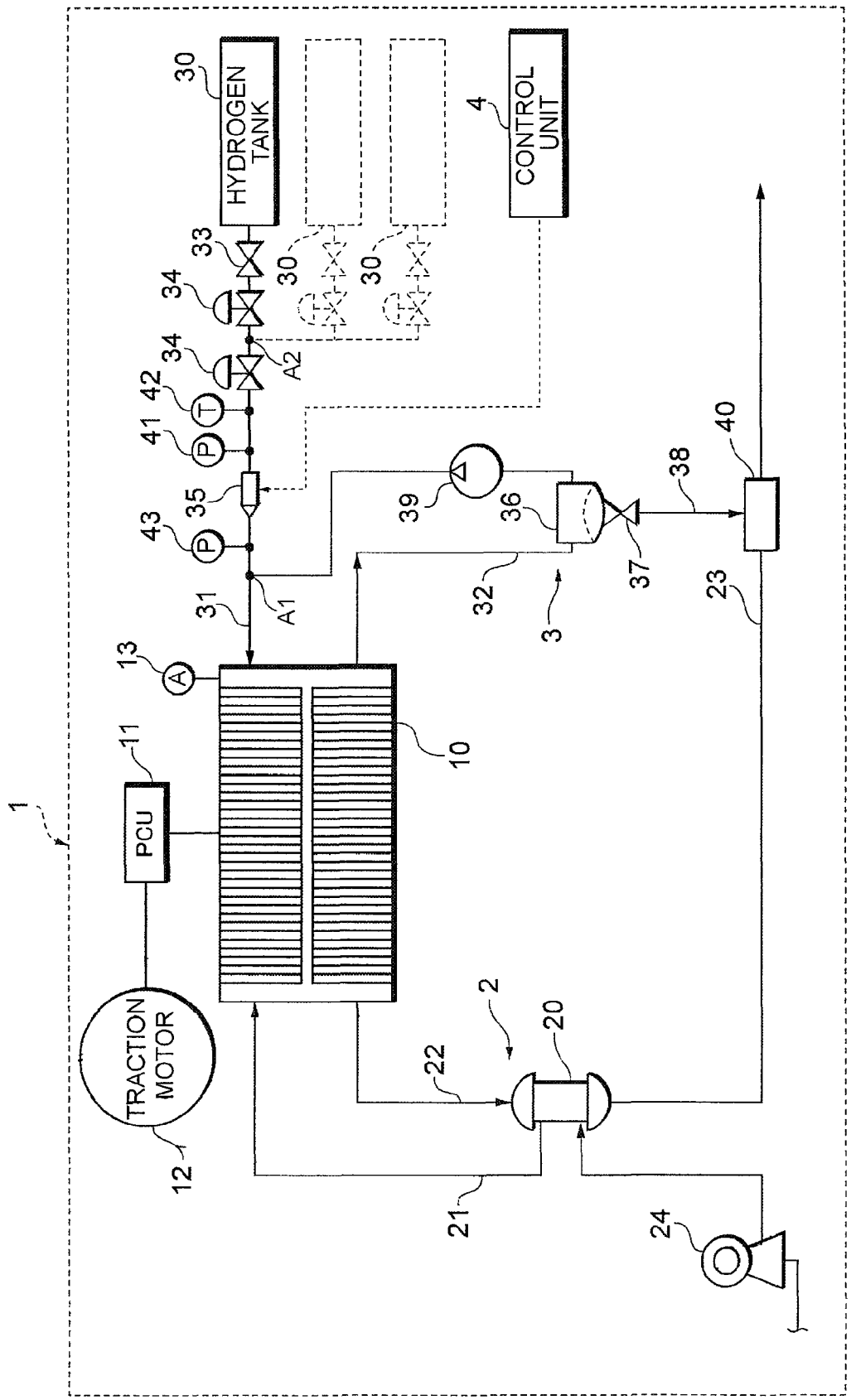
FIG. 1 is a constitution diagram of a fuel cell system according to an embodiment of the present invention.

As shown in FIG. 1, the fuel cell system 1 according to the present embodiment includes a fuel cell 10 which receives the supply of a reactant gas (an oxidizing gas and a fuel gas) to generate power, and further includes an oxidizing gas piping system (a fuel supply system) 2 which supplies air as an oxidizing gas to the fuel cell 10, a hydrogen gas piping system 3 which supplies a hydrogen gas as a fuel gas to the fuel cell 10, a control unit (control device, learning device) 4 which generally controls the whole system and the like.

The fuel cell 10 has a stack structure in which the required number of unitary cells for receiving the supply of a reactant gas to generate power are laminated, and the power generated by the fuel cell 10 is supplied to a power control unit (PCU) 11. The PCU 11 includes an inverter, a DC-DC converter and the like arranged between the fuel cell 10 and a traction motor 12. Moreover, a current sensor 13 for detecting a current during power generation is attached to the fuel cell 10.

The oxidizing gas piping system 2 has an air supply passage 21 which supplies the oxidizing gas (air) humidified by a humidifier 20 to the fuel cell 10, an air discharge passage 22 which guides an oxidizing off gas discharged from the fuel cell 10 to the humidifier 20, and an exhaust passage 23 for guiding the oxidizing off gas from the humidifier 20 to the outside. The air supply passage 21 is provided with a compressor 24 which takes the oxidizing gas from the atmosphere to feed the gas under pressure to the humidifier 20.

The hydrogen gas piping system 3 includes a hydrogen tank 30 as a fuel supply source in which the hydrogen gas having a high pressure (e.g., 70 MPa) is received, a hydrogen supply passage 31 as a fuel supply passage for supplying the hydrogen gas of the hydrogen tank 30 to the fuel cell 10, and a circulation passage 32 which returns a hydrogen off gas discharged from the fuel cell 10 to the hydrogen supply passage 31. The hydrogen gas piping system 3 is one embodiment of a fuel supply system in the present invention.

It is to be noted that instead of the hydrogen tank 30, a reformer which generates a hydrogen-rich reformed gas from a hydrogen carbide based fuel, and a high-pressure gas tank which receives the reformed gas generated by this reformer in a high pressure state may be employed as the fuel supply source. Moreover, a tank having a hydrogen occluded alloy may be employed as the fuel supply source.

The hydrogen supply passage 31 is provided with a blocking valve 33 which blocks or allows the supply of the hydrogen gas from the hydrogen tank 30, a regulator 34 which adjusts the pressure of the hydrogen gas, and an injector (a gas state variable supply device) 35. Moreover, on the upstream side of the injector 35, there are provided a primary-side pressure sensor 41 and a temperature sensor 42 for detecting the pressure and the temperature of the hydrogen gas in the hydrogen supply passage 31, respectively. Moreover, a secondary-side pressure sensor 43 for detecting the pressure of the hydrogen gas in the hydrogen supply passage 31 is provided on the downstream side of the injector 35 and on the upstream side of a joining part between the hydrogen supply passage 31 and the circulation passage 32.

The regulator 34 is a device which adjusts the upstream-side pressure (the primary pressure) of the regulator to a preset secondary pressure. In the present embodiment, a mechanical pressure reduction valve which reduces the primary pressure is employed as the regulator 34. As the constitution of the mechanical pressure reduction valve, a known constitution may be employed which has a housing where a back pressure chamber and a pressure adjustment chamber are separated from each other via a diaphragm and which reduces the primary pressure to a predetermined pressure as the secondary pressure in the pressure adjustment chamber by the back pressure in the back pressure chamber.

In the present embodiment, as shown in FIG. 1, two regulators 34 are arranged on the upstream side of the injector 35, whereby the upstream-side pressure of the injector 35 can effectively be reduced. Therefore, the degree of freedom in the design of the mechanical structure (a valve body, a housing, a passage, a driving device and or like) of the injector 35 can be increased.

Moreover, since the upstream-side pressure of the injector 35 can be reduced, it can be prevented that the valve body of the injector 35 does not easily move owing to the increase of a differential pressure between the upstream-side pressure and the downstream-side pressure of the injector 35. Therefore, the variable pressure adjustment breadth of the downstream-side pressure of the injector 35 can be enlarged, and the lowering of the responsiveness of the injector 35 can be suppressed.

The injector 35 is an electromagnetic driving type opening/closing valve in which a valve body is directly driven by an electromagnetic driving force in a predetermined driving period to be detached from a valve seat, whereby a gas state such as a gas flow rate or a gas pressure can be adjusted. The injector 35 includes the valve seat having a jet hole which jets a fuel gas such as the hydrogen gas, a nozzle body which supplies and guides the gas fuel to the jet hole, and the valve body which is received and held so as to be movable with respect to this nozzle body in an axial direction (a gas flow direction) and which opens or closes the jet hole.

In the present embodiment, the valve body of the injector 35 is driven by a solenoid as the electromagnetic driving device, and a pulse-like excitation current to be supplied to this solenoid can be turned on or off to switch the open area of the jet hole in two stages, in multiple stages, continuously (steplessly) or linearly. The gas injection time and the gas injection timing of the injector 35 are controlled by a control signal output from the control unit 4 to precisely control the flow rate and the pressure of the hydrogen gas.

The injector 35 directly drives the valve (the valve body and the valve seat) to open or close by the electromagnetic driving force, and the driving period of the valve can be controlled to a highly responsive region, so that the injector has a high responsiveness.

In the injector 35, to supply the gas to the downstream side of the injector at a demanded flow rate, at least one of the open area (the open degree) and the opening time of the valve body provided in the gas passage of the injector 35 is changed to adjust the flow rate (or the hydrogen molar concentration) of the gas to be supplied to the downstream side (the fuel cell 10 side).

It is to be noted that the valve body of the injector 35 is opened or closed to adjust the gas flow rate, and the pressure of the gas to be supplied to the downstream side from the injector 35 is reduced to a pressure smaller than the gas pressure on the upstream side from the injector 35, so that the injector 35 may be interpreted as a pressure adjustment valve (a pressure reduction valve, a regulator). Moreover, in the present embodiment, the injector may be interpreted as a variable pressure adjustment valve capable of changing the amount of the upstream gas pressure of the injector 35 to be adjusted (to be reduced) so that the pressure matches a demanded pressure in a predetermined pressure range in accordance with a demand for the gas.

It is to be noted that in the present embodiment, as shown in FIG. 1, the injector 35 is arranged on the upstream side from a joining part A1 between the hydrogen supply passage 31 and the circulation passage 32. Moreover, in a case where a plurality of hydrogen tanks 30 are employed as a fuel supply source as shown by a broken line in FIG. 1, the injector 35 is arranged on the downstream side from a portion (a hydrogen gas joining part A2) where the hydrogen gases supplied from the respective hydrogen tanks 30 join one another.

The circulation passage 32 is connected to a discharge passage 38 via a gas-liquid separator 36 and a gas/liquid release valve 37. The gas-liquid separator 36 collects a water content from the hydrogen off gas. The gas/liquid release valve 37 is operated by a command from the control unit 4, to discharge (purge) the water container collected by the gas-liquid separator 36 and the hydrogen off gas including impurities in the circulation passage 32 from the system.

Moreover, the circulation passage 32 is provided with a hydrogen pump 39 which pressurizes the hydrogen off gas in the circulation passage 32 to feed the gas toward the hydrogen supply passage 31. It is to be noted that the gas in the discharge passage 38 is diluted by a diluter 40 to join the gas in the exhaust passage 23.

The control unit 4 detects the operation amount of an acceleration operating device (an accelerator or the like) provided in a vehicle, and receives control information such as a demanded acceleration value (e.g., the power generation amount demanded from a load device such as the traction motor 12) to control the operations of various units in the system.

It is to be noted that except the traction motor 12, the load device is a generic power consumption device such as an auxiliary device (e.g., a motor for the compressor 24, the hydrogen pump 39, a cooling pump or the like) necessary for operating the fuel cell 10, an actuator for use in any type of device (a change gear, a wheel control unit, a steering device, a suspension device or the like) concerned with the running of the vehicle, an air conditioner for a passenger space, an illumination, or an audio unit.

The control unit 4 is constituted of a computer system (not shown). Such a computer system includes a CPU, an ROM, an RAM, an HDD, an input/output interface, a display and the like, and the CPU reads and executes any type of control program recorded in the ROM to realize any type of control operation.

Specifically, as shown in a flow chart of FIG. 2, the control unit 4 detects the power generation current (hereinafter referred to as the FC current) of the fuel cell 10 by the current sensor 13 (step S1), and the control unit obtains an FC inlet target pressure from the FC current detected in the step S1 by use of, for example, a map shown in FIG. 3, that is, a map showing a relation between the FC current detected in the step S1 and the inlet-side target pressure (hereinafter referred to as the FC inlet target pressure) of the fuel cell 10 set corresponding to the output demanded with respect to the fuel cell 10 (step S3).

Figure 4:
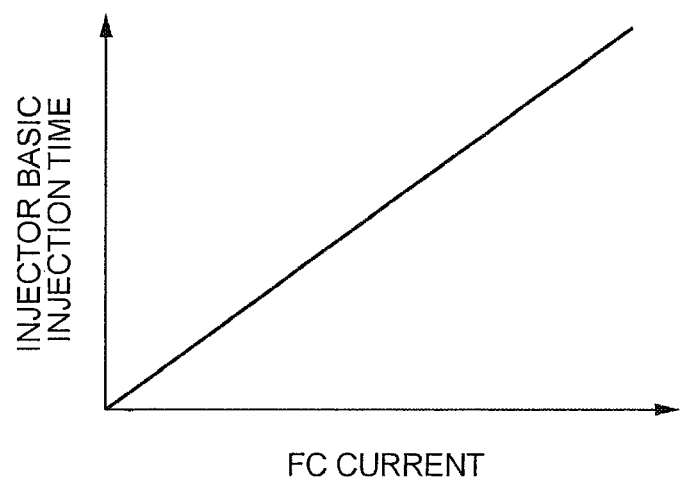
FIG. 4 shows one example of a map for use in the processing of step S5 of the flow chart shown in FIG. 2.

Next, the control unit 4 first obtains the basic injection time of the injector 35 from the FC current detected in the step S1 by use of, for example, a map shown in FIG. 4, that is, a map showing a relation between the FC current and the basic injection time of the injector 35. Afterward, this basic injection time based on the FC current is multiplied by a predetermined correction coefficient K for correction (learning), and the thus obtained value is re-defined as the basic injection time to obtain an injection time feedforward term (hereinafter referred to as the F/F term) to be obtained finally (step S5).

Figure 5:
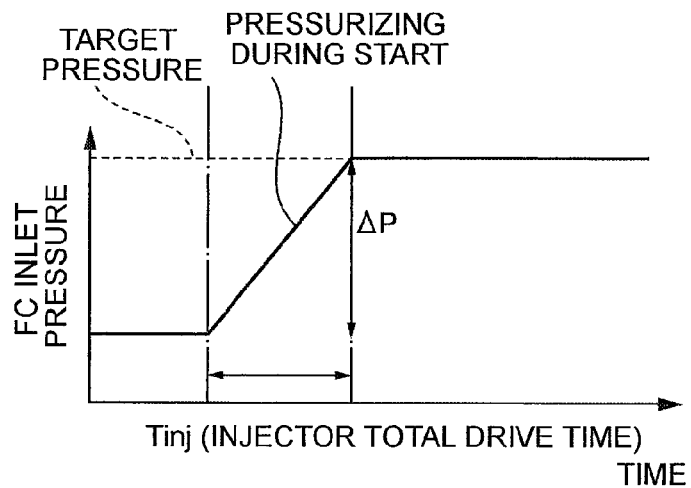
FIG. 5 shows another example of the map for use in the processing of the step S5 of the flow chart shown in FIG. 2.

As shown in FIG. 5, this correction coefficient K is set by obtaining a flow rate characteristic per unit drive time of the injector 35 from a relation between a total drive time Tinj and a total injection quantity Q of the injector 35 until an FC inlet pressure on the anode side of the fuel cell 10 reaches a predetermined target pressure by increasing the FC inlet pressure to the target pressure at a system start (pressurizing during the start). The correction coefficient is updated every system start.

Figure 6:
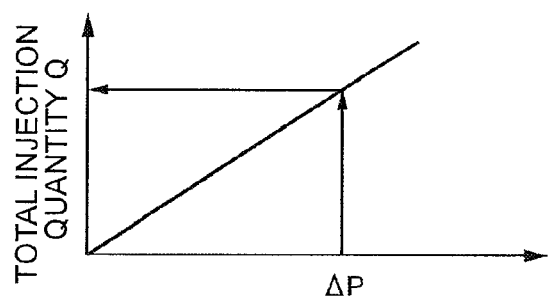
FIG. 6 shows still another example of the map for use in the processing of the step S5 of the flow chart shown in FIG. 2.

Specifically, first the total injection quantity Q (the first value) is obtained from a pressure rise breadth ΔP (the gas supply change of a predetermined value or more) during the pressurizing by use of, for example, a map shown in FIG. 6, that is, a map showing a relation between the pressure rise breadth ΔP from the start of the pressurizing during the start to the time when the target pressure is reached and the total injection quantity Q of the injector 35. Next, this obtained total injection quantity Q is divided by the total drive time Tinj (the second value) of the injector 35 to obtain a flow rate characteristic Cinj (=the total injection quantity Q/the total drive time Tinj) of the injector 35.

Next, a flow rate characteristic ratio inherent in the injector 35 is obtained using this obtained flow rate characteristic Cinj and a basic flow rate characteristic Cinj_base initialized during the shipping of the fuel cell system 1 or the like. Then, by use of this flow rate characteristic ratio as the correction coefficient K (=the flow rate characteristic Cinj/the basic flow rate characteristic Cinj_base) in a case where the F/F term is obtained, the F/F term (=the correction coefficient K×the basic injection time based on the FC current) is obtained.

Next, the control unit 4 obtains a difference (hereinafter referred to as the FC inlet pressure difference) between the FC inlet target pressure obtained in the step S3 of FIG. 2 and the present inlet-side pressure (hereinafter referred to as the FC inlet pressure) of the fuel cell 10 detected by the secondary-side pressure sensor 43 (step S7), and the control unit obtains the feedback term (hereinafter referred to as the F/B term) of the injector injection time as a correction value for correcting (decreasing) this FC inlet pressure difference (step S9).

Next, the control unit 4 calculates an invalid injection time Tv of the injector 35 based on the gas state (the pressure and temperature of the hydrogen gas) on the upstream side from the injector 35 and an applied voltage (step S11). The invalid injection time Tv is a time required from a time when the injector 35 receives the control signal from the control unit 4 to a time when the injection is actually started.

In the present embodiment, the invalid injection time Tv is calculated and updated every calculation period of the control unit 4 by use of a specific map showing a relation of the pressure and temperature of the hydrogen gas on the upstream side from the injector 35, the applied voltage and the invalid injection time Tv.

Next, the control unit 4 adds the FIB term obtained in the step S9 and the invalid injection time Tv obtained in the step S11 to the F/F term of the injector 35 obtained in the step S3, to obtain the injection time (the injection quantity) of the injector 35 (step S13).

Then, the control unit 4 outputs a control signal for realizing such an injector injection time to the injector 35 to control the injection time and the injection timing of the injector 35, thereby adjusting the flow rate and the pressure of the hydrogen gas to be supplied to the fuel cell 10.

As described above, according to the fuel cell system 1 of the present embodiment, to obtain the injection time of the injector 35, the F/F term as the basic injection time is corrected with the F/B term and the invalid injection time Tv. Therefore, as compared with a case where the injection time is obtained only from the F/F term, the flow rate and the pressure of the hydrogen gas to be supplied to the fuel cell 10 can precisely be corrected with a satisfactory responsiveness.

In addition, as to the F/F term of the present embodiment, the basic injection time based on the FC current is not used as it is as the F/F term. This basic injection time based on the FC current is corrected using the correction coefficient K (the flow rate characteristic per unit drive time of the injector 35) obtained from the relation between the total drive time Tinj and the total injection quantity Q of the injector 35 to a time when the FC inlet pressure reaches the predetermined target pressure and updated every time during the system start, and this corrected time is used as the F/F term.

That is, in the present embodiment, the correction coefficient K of the F/F term is obtained every system start to learn the flow rate characteristics due to the aging and the individual difference of the injector 35, and the learning result is reflected in the F/F term. Therefore, the flow rate and the pressure of the hydrogen gas to be supplied to the fuel cell 10 can precisely be controlled with a satisfactory responsiveness while suppressing the influence of the fluctuation due to the aging and the individual difference of the injector 35.

Moreover, in the present embodiment, in a state in which any hydrogen gas is not consumed by the fuel cell 10, in other words, during the system start with little disturbance, the flow rate characteristics due to the aging and the individual difference of the injector 35 are learned, so that highly precise learning can be realized.

Figure 7:
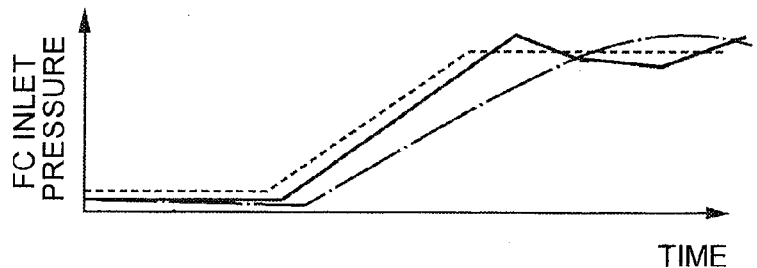
FIG. 7 is a diagram showing the result of the comparison of the followability of an actual FC inlet pressure with respect to the target pressure of the FC inlet pressure between one example of the present invention and one comparative example.

FIG. 7 shows one example of the comparison result of the followability of the actual FC inlet pressure with respect to the target pressure of the FC inlet pressure. A solid line shows the target pressure of the FC inlet pressure, a broken line shows one example of the present invention in which the basic injection time based on the FC current is multiplied by the correction coefficient K to obtain the F/F term, and a one-dot chain line shows one comparative example in which the basic injection time based on the FC current is used as it is as the F/F term. As shown in the drawing, the followability of the FC inlet pressure with respect to the target pressure in the present example is remarkably excellent as compared with the comparative example.

It is to be noted that the correction coefficient K may be corrected in accordance with the primary pressure (the upstream pressure) of the injector 35 detected by the primary-side pressure sensor 41. For example, in a case where the primary pressure of the injector 35 is relatively high, as compared with a case where the primary pressure is relatively low, the total drive time Tinj shortens even with the equal total injection quantity Q, so that the apparent flow rate characteristic Cinj (=the total injection quantity Q/the total drive time Tinj) becomes larger than the actual flow rate characteristic. Therefore, the correction coefficient K is corrected so that as the primary pressure of the injector 35 is high, the correction coefficient decreases.

Moreover, the correction coefficient K may be corrected in accordance with the primary-side gas temperature of the injector 35 detected by the temperature sensor 42. For example, in a case where the primary-side gas temperature of the injector 35 is relatively high, as compared with a case where the temperature is relatively low, the mass flow rate of the hydrogen gas decreases in terms of a volume flow rate even with the equal total injection quantity Q, so that the apparent flow rate characteristic Cinj (=the total injection quantity Q/the total drive time Tinj) becomes larger than the actual flow rate characteristic.

To solve the problem, the correction coefficient K is corrected so that as the primary-side gas temperature of the injector 35 is high, the correction coefficient decreases. It is to be noted that instead of the primary-side gas temperature of the injector 35, the correction coefficient K may be corrected using the temperature of the fuel cell 10, the temperature of a refrigerant for cooling the fuel cell 10 or the like.

Additionally, in the fuel cell system 1 including the above injector 35 disposed in the hydrogen supply passage 31, the flow rate of the hydrogen gas can be measured using the injection time of the injector 35. In such a case, when there is, for example, a fluctuation due to aging and individual difference in the invalid injection time Tv of the injector 35, the precision of the injection time of the injector 35 is influenced by this fluctuation, and the precision of the flow rate measurement lowers.

Therefore, to precisely measure the flow rate of the hydrogen gas in the injector 35, the invalid injection time Tv of the injector 35 is preferably updated (learned) in accordance with the actual situation of the injector 35 every system start, so that the influence of the fluctuation due to the aging and the individual difference of the injector 35 is suppressed. One learning example of the invalid injection time Tv will hereinafter be described with reference to the drawings.

Figure 8:
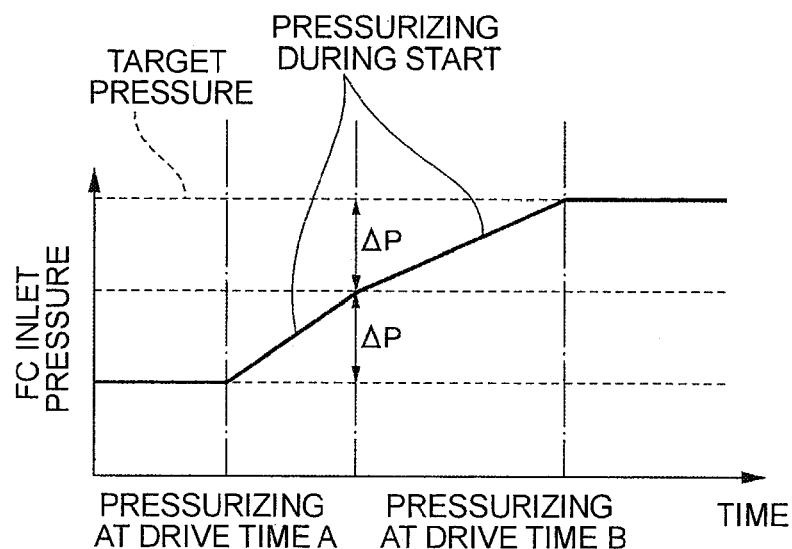
FIG. 8 shows one example of a map for use in the processing of step S11 of the flow chart shown in FIG. 2.
Figure 9:
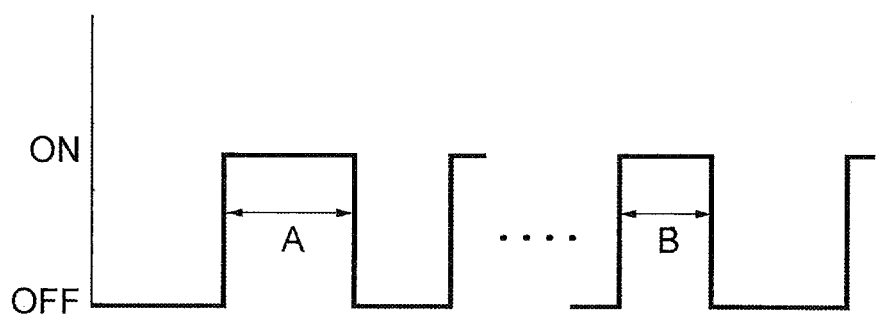
FIG. 9 is a diagram showing one example of a drive time A, B shown in FIG. 8.

First, as shown in FIGS. 8 and 9, the injector 35 is pressurized on mutually different driving conditions, that is, twice (the pressurizing during the start) at drive times (supply times) Ta, Tb (with the proviso that Ta≠Tb) per injection (one supply time) so that the FC inlet pressure on the anode side of the fuel cell 10 has a predetermined pressure rise breadth ΔP during the system start, to obtain the number of injection times Na, Nb (the number of the fuel gas supply times) during the pressurizing every time.

At this time, as shown in, for example, the above map of FIG. 6, there is a unique relation between the pressure rise breadth ΔP and the total injection quantity Q, so that when the pressure rise breadth ΔP is equal, the total injection quantity Q is also equal. That is, a total injection quantity Q1 of the injector 35 at the first pressurizing time is equal to a total injection quantity Q2 of the injector 35 at the second pressurizing time, which results in the total injection quantity Q1=the total injection quantity Q2.

Moreover, as to the total injection quantities Q1, Q2 during the pressurizing every time, the total injection quantity Q1=the number Na of the injection times×(the driving time Ta–the invalid injection time Tv), and the total injection quantity Q2=the number Nb of the injection times×(the driving time Tb–the invalid injection time Tv).

Therefore, the total injection quantity Q1=the number Na of the injection times·(the driving time Ta–the invalid injection time Tv)=the total injection quantity Q2=the number Nb of the injection times•(the driving time Tb–the invalid injection time Tv). When this equation is organized to obtain the invalid injection time Tv (the invalid supply time), the invalid injection time Tv=(the number Nb of the injection times·the driving time Tb–the number Na of the injection times·the driving time Ta)/(the number Nb of the injection times–the number Na of the injection times).

Figure 2:
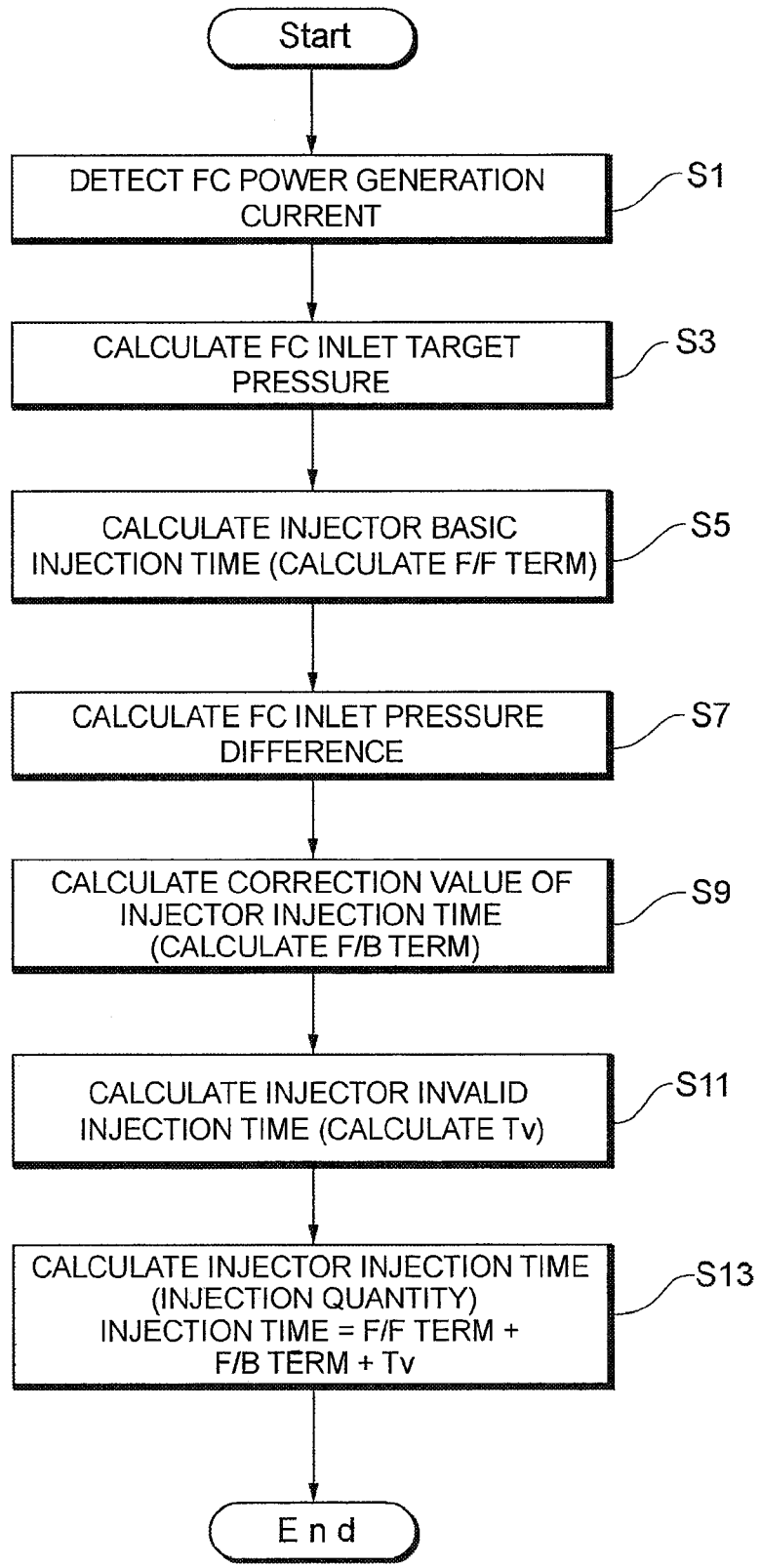
FIG. 2 is a flow chart for explaining the calculation process of an injector injection time in the fuel cell system shown in FIG. 1.
Figure 3:
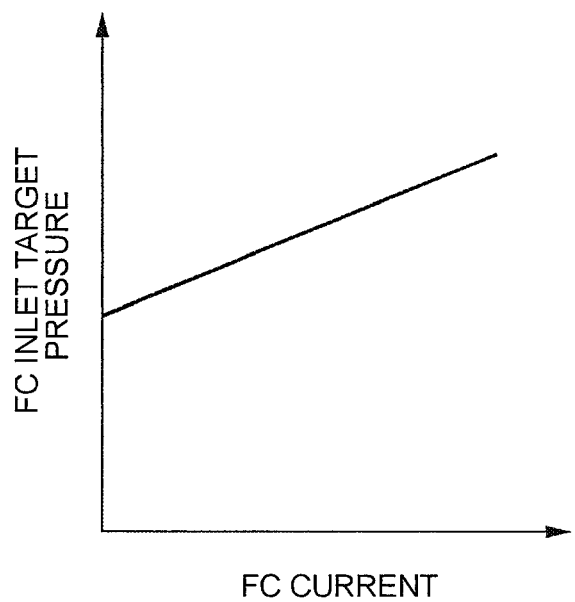
FIG. 3 shows one example of a map for use in the processing of step S3 of the flow chart shown in FIG. 2.

The control unit 4 adds the invalid injection time Tv obtained during the system start as described above to the F/F term of the injector 35 obtained in the step S3 of FIG. 2 and the F/B term obtained in the step S9, to obtain the injection time of the injector 35. The control unit outputs the control signal for realizing such a jet time to the injector 35, to control the injection time and the injection timing of the injector 35.

As described above, in the fuel cell system 1 of the present embodiment, as the invalid injection time Tv of the injector 35, there is employed the invalid injection time Tv obtained from the injection time numbers Na, Nb at a time when the injector 35 is pressurized at the mutually different driving times Ta, Tb (Ta≠Tb) per injection time so that the FC inlet pressure on the anode side of the fuel cell 10 has the predetermined pressure rise breadth ΔP during the system start.

That is, in the present embodiment, the invalid injection time Tv is updated every system start to learn the fluctuation of the invalid injection time Tv due to the aging and the individual difference of the injector 35, and the learning result is reflected in the injection time of the injector 35. Therefore, the flow rate and the pressure of the hydrogen gas to be supplied to the fuel cell 10 can precisely be controlled with the satisfactory responsiveness while suppressing the influence of the fluctuation due to the aging and the individual difference of the injector 35.

In consequence, even during the measurement of the flow rate in the hydrogen supply passage 31 using the injector 35, the influence of the fluctuation due to the aging and the individual difference of the injector 35 is suppressed, so that the flow rate of the hydrogen gas from the injector 35 can precisely be measured with a satisfactory responsiveness.

Moreover, in the present embodiment, in a state in which any hydrogen gas is not consumed by the fuel cell 10, in other words, during the system start with only little disturbance, the learning of the invalid injection time Tv in accordance with the aging and the individual difference of the injector 35 is performed, so that the highly precise learning can be realized.

It is to be noted that in the above embodiment, the pressure rise breadth ΔP at the first pressurizing time is set to a pressure rise breadth equal to that at the second pressurizing time, but does not necessarily have to be set to the equal pressure rise breadth.

Moreover, in the above embodiment, the example in which the fuel cell system according to the present invention is mounted on a fuel cell vehicle has been described, but the fuel cell system according to the present invention can be mounted on any type of mobile body (a robot, a ship, an airplane or the like) other than the fuel cell vehicle. Furthermore, the fuel cell system according to the present invention may be applied to a stational power generation system for use as power generation equipment for construction (a housing, a building or the like).

The invention claimed is:

1. A fuel cell system comprising: a fuel cell; a fuel supply system which supplies a fuel gas to the fuel cell; a gas state variable supply device which adjusts the gas state of the fuel supply system on an upstream side to supply the gas to a downstream side; and a control device for driving and controlling the gas state variable supply device in accordance with the operation state of the fuel cell, the system further comprising: a control unit including a computer system configured to read and execute control programs recorded on a read-only memory of the computer system, the control unit programmed to learn driving characteristics of the gas state variable supply device to set a driving parameter of the gas state variable supply device based on the result of the learning, the control unit programmed to learn the driving characteristics using at least a first value based on a gas supply change in the gas state variable supply device having a value equal to or greater than a predetermined value and a second value based on an operation command value of the gas state variable supply device.

2. The fuel cell system according to claim 1, wherein the control unit is programmed to correct the driving characteristics of the gas state variable supply device to be learned in accordance with an upstream pressure of the gas state variable supply device.

3. The fuel cell system according to claim 1, wherein the control unit is programmed to correct the driving characteristics of the gas state variable supply device to be learned in accordance with a temperature of the fuel gas.

4. The fuel cell system according to claim 1, wherein the gas state variable supply device is an injector including an inner passage which connects an upstream side of the injector to a downstream side thereof, a valve body movably arranged in the inner passage and configured to change the opening state of the inner passage in accordance with a moved position of the valve body, and a valve body driving portion which drives the valve body by an electromagnetic driving force.

5. The fuel cell system according to claim 4, wherein the operation command value is a command value which controls an injection time of the injector.

6. The fuel cell system according to claim 5, wherein the injection time of the injector includes a basic injection time obtained from a power generation current of the fuel cell as a feedforward term, and the control unit is programmed to reflect the result of the learning in the feedforward term.

7. The fuel cell system according to claim 1, wherein the gas supply change is the rise of a downstream pressure of the gas state variable supply device.

8. The fuel cell system according to claim 1, wherein the control unit is programmed to perform the learning at a start of operation of the fuel cell.

* * * * *

UNITED STATES PATENT AND TRADEMARK OFFICE
CERTIFICATE OF CORRECTION

PATENT NO.      : 8,609,292 B2  
APPLICATION NO. : 12/300849  
DATED           : December 17, 2013  
INVENTOR(S)     : Kenji Umayahara Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this
Twenty-second Day of September, 2015

Michelle K. Lee
*Director of the United States Patent and Trademark Office*